P. BROWN.
Dies for Smoothing and Shaping Soldered Tubes.

No. 166,337. Patented Aug. 3, 1875.

Witnesses.
John Becker
Benj. W. Hoffman

Philo Brown
by his Attorneys
Brown & Allen

UNITED STATES PATENT OFFICE.

PHILO BROWN, OF WATERBURY, CONNECTICUT.

IMPROVEMENT IN DIES FOR SMOOTHING AND SHAPING SOLDERED TUBES.

Specification forming part of Letters Patent No. 166,337, dated August 3, 1875; application filed July 1, 1875.

*To all whom it may concern:*

Be it known that I, PHILO BROWN, of Waterbury, in the county of New Haven and State of Connecticut, have invented a new and useful Improvement in Dies for Smoothing and Shaping Soldered Tubes; and I do hereby declare that the following is a full, clear, and exact description of the same, reference being had to the accompanying drawing, which forms part of this specification.

This invention consists in a die of novel construction for smoothing and shaping soldered metal tubes, whereby the surplus solder on the exterior of the tube is scraped off or removed by the die which smooths and shapes the tube.

Figure 1:
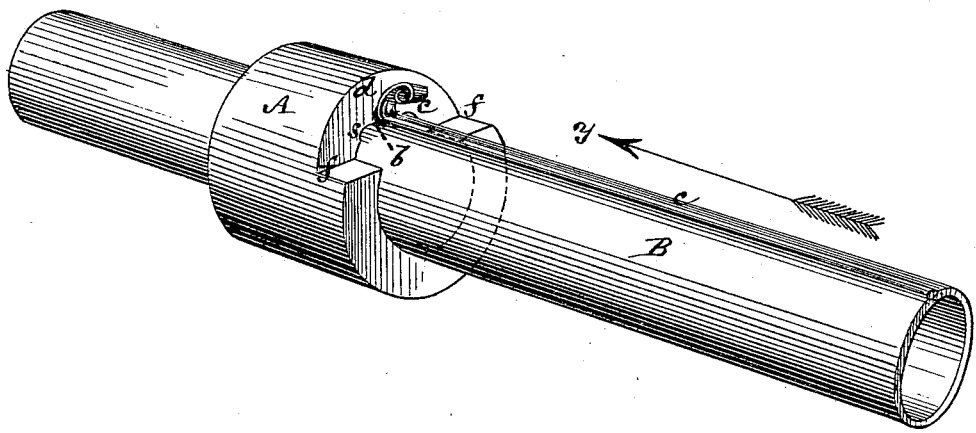
Figure 2:
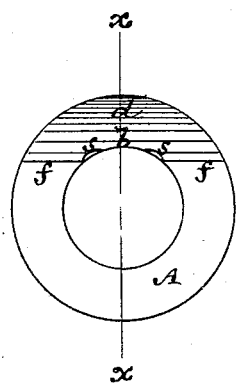
Figure 3:
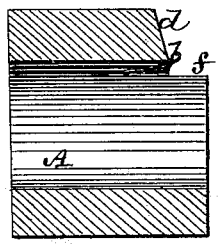

Figure 1 represents a view in perspective of my improved die, with a tube as in the act of being drawn through it. Fig. 2 is a front-end view of said die, and Fig. 3 a longitudinal section thereof on the line $x\ x$.

A is a circular die, which may be secured to a draw-bench, and the ordinary or any suitable means be employed to draw the tubes through said die. This die A not only serves to smooth and shape or secure the necessary rotundity to the tube B as the latter is drawn, in direction of the arrow $y$, through the die, but also to scrape off or remove, as represented in Fig. 1, the surplus solder on the exterior of the tube used to unite the joint or longitudinal edges of a soldered metal tube. To thus simultaneously scrape off such surplus solder the circular die A is constructed in front with a cutting-edge, $b$, at one portion only in its bore, and which is the part through or past which the exterior soldered surface $c$ of the tube is drawn. The remaining portion of the front end of the die has no cutting-edge, but may be sufficiently large to admit of the easy entry of the tube within the die, and clearance reductions $s\ s$ be made in the forward portion of the die, on either side of the cutting-edge $b$. Furthermore, said die is transversely reduced or cut away in front at its cutting or scraping edge portion $b$, and the back $d$ of such cut-away portion $f\ f$ made beveling to give a sharp edge to the cutter or scraper $b$. This reduction $f\ f$, too, which may be less than one-half the diameter of the die, serves to admit of the ready entrance and proper guidance of the tube within the die in advance of the soldered surface of the tube, meeting the cutter $b$, and so that the protruding surplus solder on the exterior of the tube, which the cutter $b$ scrapes off as the tube is drawn through the die, offers no impediment to the entry of the tube within the die.

I claim—

The improved circular die herein described, for smoothing and shaping soldered metal tubes, constructed with the cutting-edge $b$ at one portion only in front, for the purpose of scraping the surplus solder from the exterior of the tube as the latter is drawn in through the die, substantially as specified.

PHILO BROWN.

Witnesses:
 EDW. L. FRISBIE, Jr.,
 HIRAM VAN DUSEN.